United States Patent [19]

Schoch

[11] Patent Number: 4,494,455

[45] Date of Patent: Jan. 22, 1985

[54] DEVICE FOR PREPARING DIE MEMBERS OF A PLATEN PRESS

[75] Inventor: Gregor Schoch, Crissier, Switzerland

[73] Assignee: Bobst S.A., Lausanne, Switzerland

[21] Appl. No.: 495,583

[22] Filed: May 18, 1983

[30] Foreign Application Priority Data

May 18, 1982 [CH] Switzerland ............... 3075/82

[51] Int. Cl.³ .............................................. B41F 1/38
[52] U.S. Cl. .............................. 101/3 R; 33/185 R; 72/418; 76/107 R; 101/318; 425/177
[58] Field of Search .......... 72/418, 446, 448; 76/107 R, 107 C, 110; 33/185 R, 1 R; 83/13, 701; 29/465; 156/230, 240, 581; 264/219, 320; 425/177; 101/3 R, 12, 318, 316, 287

[56] References Cited

U.S. PATENT DOCUMENTS

| | | | |
|---|---|---|---|
| 1,663,330 | 3/1928 | Baker et al. | 101/3 R |
| 1,820,437 | 8/1931 | Cavagnaro | 101/3 R |
| 2,787,922 | 4/1957 | Bien | 76/107 C |
| 3,111,100 | 11/1963 | Georgeff | 72/466 |
| 3,321,952 | 5/1967 | Wagner | 72/418 |
| 4,112,827 | 9/1978 | Kang | 76/107 C |
| 4,294,096 | 10/1981 | Heiman | 72/60 |

Primary Examiner—Frank T. Yost
Assistant Examiner—Hien H. Phan
Attorney, Agent, or Firm—Hill, Van Santen, Steadman & Simpson

[57] ABSTRACT

A device for aiding in preparing a die member of a platen press to have recesses in registry with tools of a punch member characterized by a pressing station having an upper and lower bolster for receiving a pressure-forming device and a stack including at least one backup member, a die member and the punch member so that as the pressure device acts on the stack at least the outline of the tools of the punch member is transferred to a surface of the die member. The pressure device utilizes a hydraulic plate having a recess covered by a membrane which membrane is engaged by flexible support blades or members on its outer edge which are held there by an outer frame formed of blade guides. The device also includes a transport arrangement for moving the stack between the pressure station and an unloading station.

6 Claims, 9 Drawing Figures

DEVICE FOR PREPARING DIE MEMBERS OF A PLATEN PRESS

BACKGROUND OF THE INVENTION

The present invention is directed to a device for preparing a first die member of a platen press to have recesses or openings which are in registry with tools of a second die member or punch member. The punch member may be a member of a die cutting portion of the platen press which has cutting, creasing and/or embossing tools while the first member cooperating with the second member has recesses in registration with each of the cutting, creasing and embossing tools. In addition, the die member may be a die member of a stripping station of the press which will strip waste portions from the cardboard or paper sheet by having tools of a cooperating member push the waste portions through its openings or apertures.

Cutting processes known up to now include several successive stations. In one of these various stations the sheets are cut and creased to be transformed into blanks which are then folded into boxes. The sheets can also be embossed in this station which means that they can receive a relief or sunken print. In a second station of the press, the waste resulting from the cutting operation is stripped from the sheets and in a third station all of the blanks processed in the single sheet are detached from one another. In each station, the various operations are executed with the help of tools, which comprise punches and cooperating dies. The punch member of the cutting-creasing station is in fact a plate having inserted blades, some of which are cutting the outlines of the box blank and holes in the box blank while others are only creasing members which form a fold line in the blank. The cooperating die comprises a plate having outlines which match the outlines of the various punches or tools. The grooved counterpart of this plate is arranged exactly opposite the cutting and creasing blades of the punch member. Various types of counterparts are available. They can also be machined onto a plate surface so that their axes precisely face the axes of the creasing blades. If ready-made adhesive counterparts are used, they are first fixed on the creasing and cutting blades of the punch member and afterwards they are transferred by pressure onto the surface of the die member. Of course, the punch member has been previously carefully positioned opposite the die member.

Up to now, the die member was prepared in the cutting station of the platen press and this means that the platen press was stopped during the whole time of preparation of the die member. Of course, this time loss during the preparation of the die member reduces the output of the press. An embossing tool comprising a punch and a die also requires the preparation of the die in the cutting station. Therefore, in this case, too, the machine had to be stopped.

The stripping tools, which are composed of a punch member and a die member with the punch member having stripping pins. The die member is a perforated plate with the perforations having the shape of the waste which is to be stripped from the sheet. To prepare this plate, the outline of the blanks are reproduced on it so that the waste stripping areas are clearly delineated. This is done with the punch member of the cutting station. The plate, which is to be perforated is covered first with a sheet of carbon paper, and then inserted into the platen press. The press is then set under pressure and the patterns of the punches are thus transferred onto the plate and will indicate the areas of which waste material is to be stripped from the sheet. Of course, here again the press is stopped during the whole operation which stoppage again reduces the output of the press.

SUMMARY OF THE INVENTION

The present invention is directed to providing users of platen presses with a device for constructing various die members without requiring the stopping of the platen press and thus enables an improved output from the press.

To accomplish this goal, the present invention is directed to a device for preparing a die member for a platen press to have recesses in registry with tools of a punch member, said device having a pressing station with means for receiving a stack of members including at least one backup member, the die member and the punch member, said pressing station having means for applying pressure to the stack to at least transfer an outline of the tools of the punch member to the surface of the die member; a loading station having means for loading and unloading a stack at the loading station, said means for loading having means for positioning the member and/or stack in the desired orientation, and transport means for moving the stack between the pressing station and the loading station including a plate receiving the stack and being movable between said stations so that after loading the stack on the plate, the transport means moves the plate and stack into the pressing station where the stack is pressed to transfer the outline of the tools of the punch member onto a surface of the die member.

It should be noted that the die member may be a die member which is used with the punch member of the cutting and creasing station it may be a countermember for an embossing die or it may also be a die member which is used with the punch member having the stripping tools which is used in the stripping station of the press.

The means for loading and unloading the stack at the loading station preferably include a hoist which is carried on an arm mounted on a column or pillar which is attached to one or both an upper and a lower bolster which form part of the pressing station. The means for positioning the stack in the desired orientation preferably comprise a stirrup, which is formed by a cross member with arms at each end, with gripping means at the end of each arm with both the gripping means having grips mounted on axles which can be rotated in bearings with at least one of the axles being equipped with an angular and longitudinal locking arrangement. The means for positioning allows orienting the members or stack in the desired orientation above the loading station and then the means for loading and unloading will deposit the stack or members in this desired position on a plate of the station. The transport means preferably comprise the plate mounted on rollers, which are received on two horizontally extending tracks to allow the plate to be shifted between the two stations.

The pressing means preferably comprise a piston which has a surface that will engage the plate, a hydraulic plate having a recess covered by a membrane which on its periphery is engaged by supporting blades and a frame guiding arrangement for the piston. Preferably, the membrane directly engages the lower surface of the piston as pressure is created in the recess of the hydraulic plate.

DESCRIPTION OF THE PREFERRED EMBODIMENTS

Figure 1:
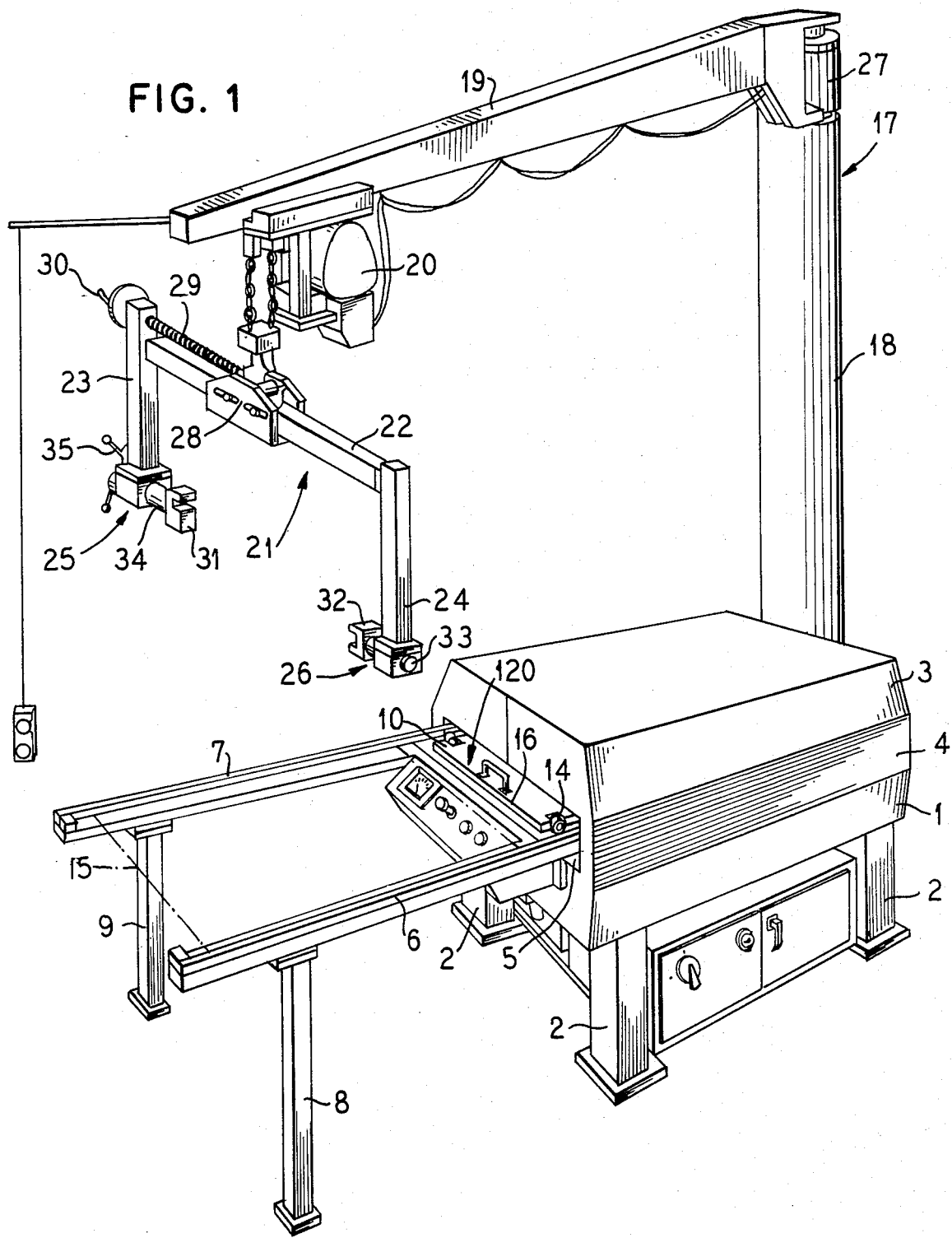
FIG. 1 is a general perspective view of a device in accordance with the present invention.

The principles of the present invention are particularly useful in a device as illustrated in FIG. 1 for preparing a die member of a platen press which has recesses in registry with tools of a punch member. The device of FIG. 1 includes a lower support or bolster 1, which is illustrated as mounted on four posts or feet 2 and is connected by a pair of parallel extending lateral cross-pieces 4 to an upper support or bolster 3. Due to the lateral cross-pieces 4, the upper and lower supports 1 and 3 leave a loading aperture 5 on one end of the device. The device has a pair of rails 6 and 7 extending from the aperture 5 with the free ends being supported by legs 8 and 9, resectively. The rails 6 and 7 provide a track on which a plate 10 that supports a stack 120, is received and moved. The stack 120 is constructed of a plurality of members such as a die member 11 (see FIG. 4). The plate 10 is provided with a plurality of rollers 14 which enable it to ride on the track and form transport means which is movable between a loading position 15 illustrated in broken lines of the loading station which is formed by the exposed portion of the track composed of the rails 6 and 7 into a pressing position 16 in a pressing station which is formed in the space between the bolsters 1 and 3.

Figure 2:
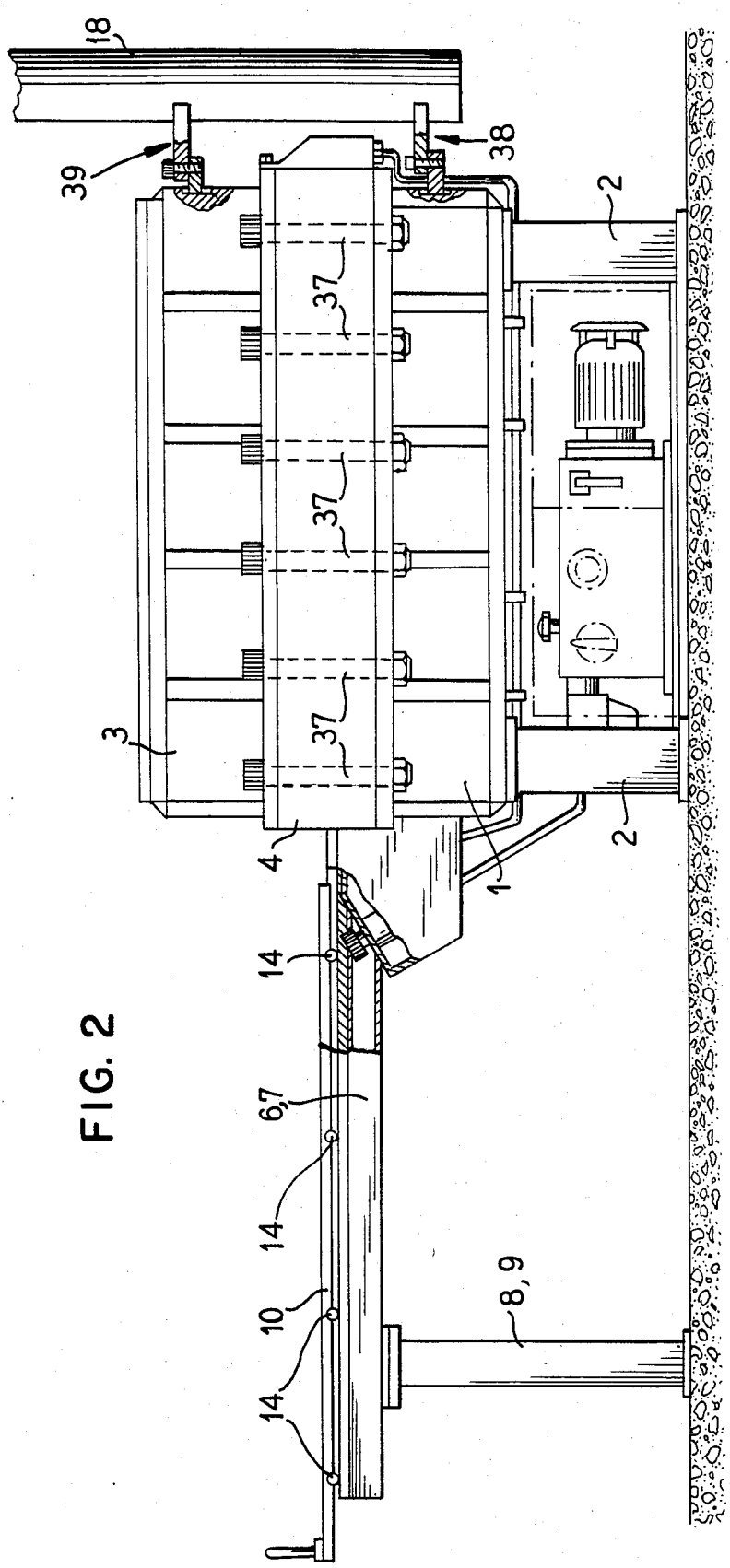
FIG. 2 is a side elevational view of the device of FIG. 1.

The device of FIG. 1 also has means for loading and unloading a stack onto the plate 10 when it is in the loading position 15. As illustrated, the means for loading and unloading comprise a hoist 17 which has a column 18 which is secured at its lower end as best illustrated in FIG. 2 by brackets 38 and 39 to the lower and upper bolsters 1 and 3 respectively. At an upper end of the column, an arm 19 is connected by a pivotable connection 27. The arm 19 contains a movable arrangement which can slide thereon which has a motorized hoist 20. The hoist 20 raises and lowers means for positioning a stack in the desired orientation which include a stirrup 21 which is formed by a cross-bar 22 received in a sleeve 28. One end of the cross-bar 22 is provided with an arm 23 and an opposite end is provided with an arm 24. The arm 23 has a gripping means 25 while the arm 24 is provided with a gripping means 26. The gripping means 26 includes a grip 32 mounted on an axle 33 which is received in a bore so that the grip 32 can be rotated on the axis of its axle 33. In a similar manner, the gripping means 25 has a grip 31 mounted on an axle 34 which is received in a bearing of a housing and can rotate on the axle. In addition, the axle 34 can be shifted along its axis and in addition to rotating and this is controlled by a lever arm such as the arm 35 which will lock it in a fixed axial and angular position. The sleeve or U-shaped member 28, which receives the cross-bar 22, can have its position adjusted relative to the arm 23 by a shifting mechanism including a screw 29 and a manually operated wheel 30. Thus, either a stack or members of a stack can be gripped and oriented in a desired position such as the plane of the plate 10 and then loaded on the plate.

As best illustrated in FIG. 2, lower bolster 1 and the upper bolster 3 are separated by the cross-member 4 and are held in a preloaded or assembled manner by a fastening means such as 37 which are illustrated as bolts. It is also noted that the plate 10 is shown in the loading and unloading position.

Figure 3:
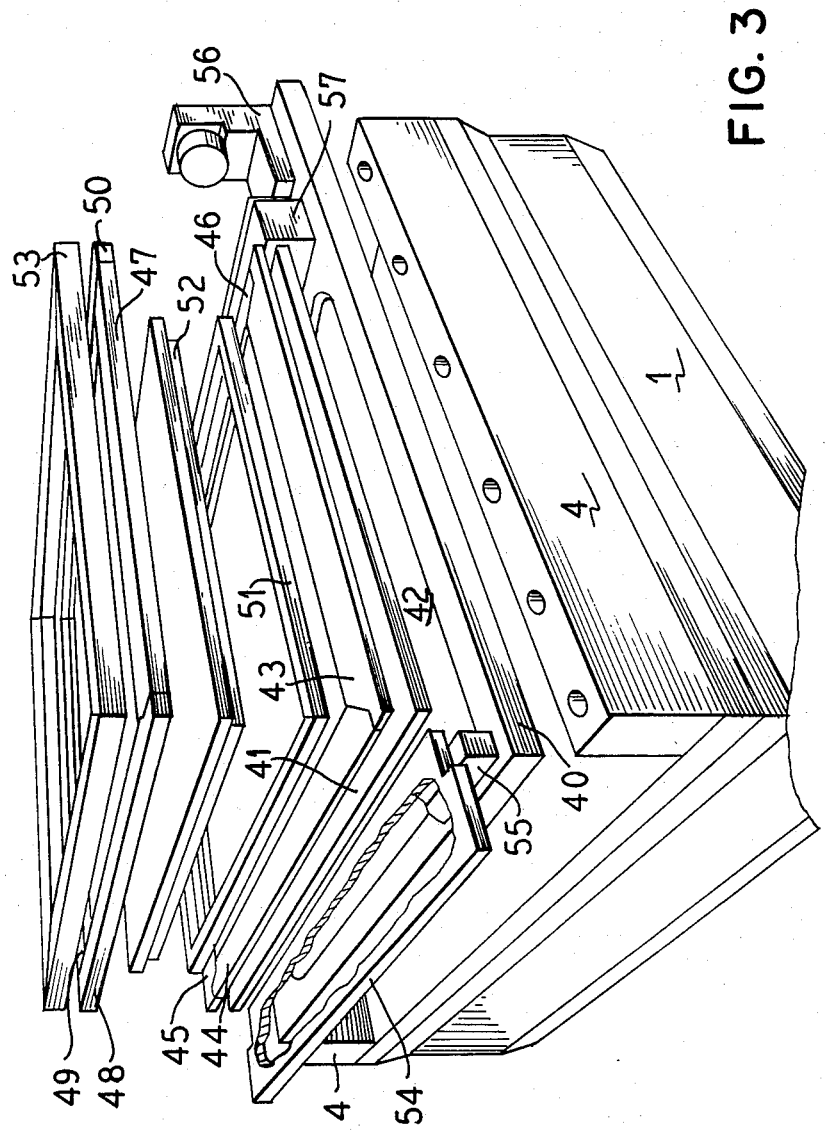
FIG. 3 is an exploded perspective view of the arrangements for creating pressure which is mounted in the base of the device of FIG. 1.
Figure 6:
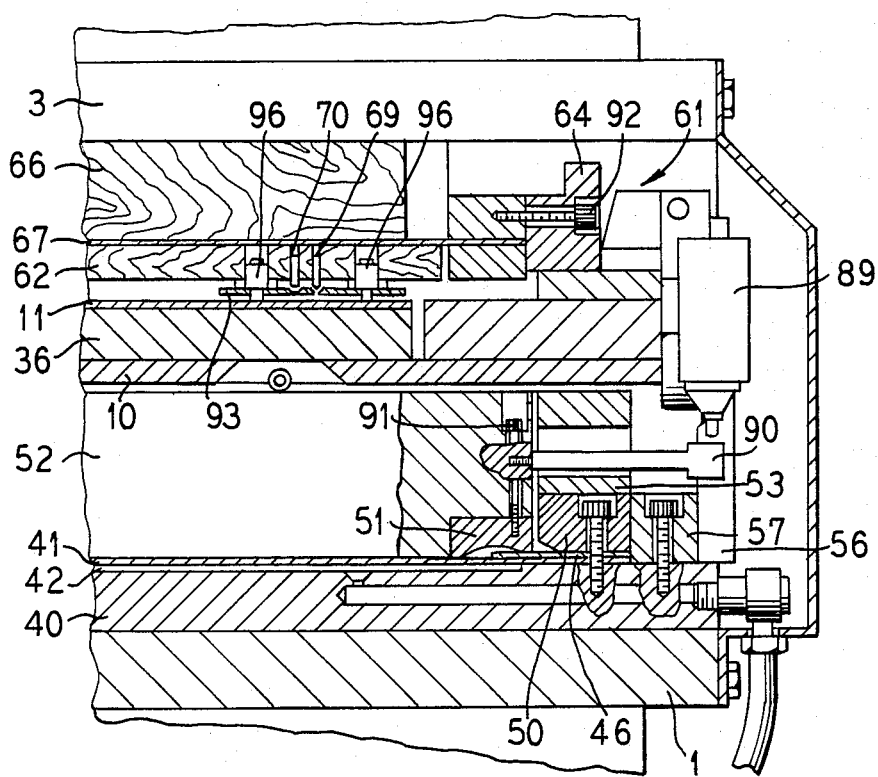
FIG. 6 is a partial cross-sectional view with portions in elevation for purposes of illustration taken through a chamber of the device illustrating an arrangement without the application of pressure.
Figure 7:
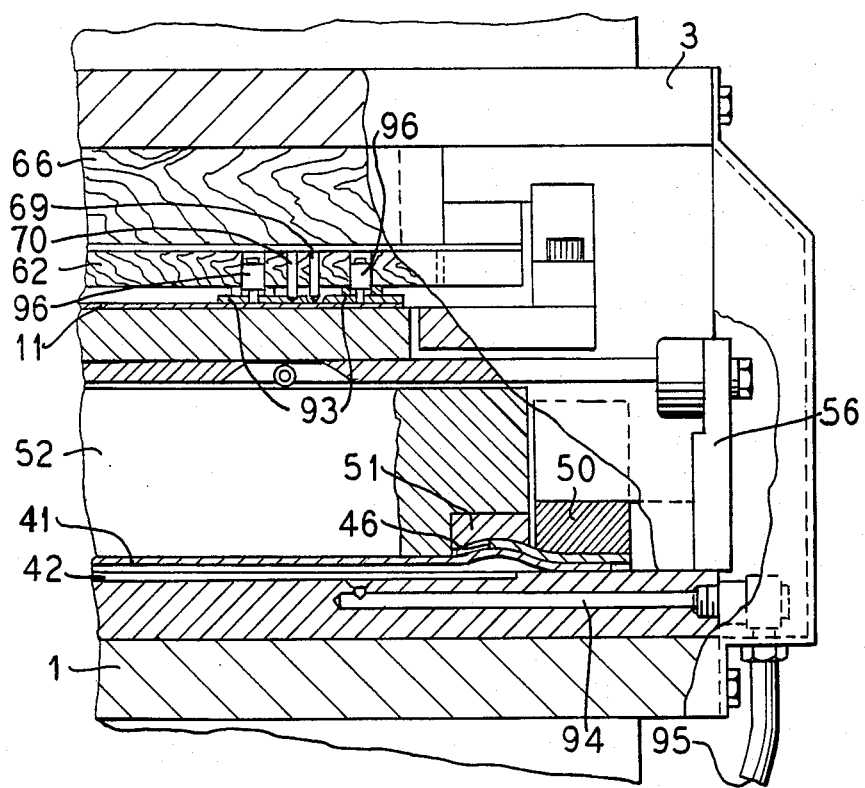
FIG. 7 is a partial cross-sectional view similar to FIG. 6 with pressure being applied.

The pressure station, as best illustrated in FIGS. 3, 6 and 7, comprises means for providing a pressure which is disposed on the lower bolster 1 between the cross-pieces 4. The means for applying pressure include a hydraulic plate 40 which is provided with a recess 42 that is covered with a flexible membrane 41. A frame which is made up of support blades or members 43, 44, 45 and 46 (FIG. 3) engages the rim of the membrane 41. This frame of members 43–46 must be able to bend when the membrane 1 is placed under pressure. The bending is limited by an outer frame formed by blade guides 47, 48, 49 and 50 which rest on the frame blade members such as 43–46. Also, an inner frame 51 engages the blade members 43–46 and is positioned within the outer frame formed by the blade guides 47–50. This inner frame 51 receives a piston 52 and the profile of the inner frame 51 as well as the blade guides is best illustrated in FIGS. 6 and 7. The guidance of the piston 52 is insured by means of an upper frame 53 which rests on and is tightened against the outer frame formed by the members 47–50 such as by fastening means such as screws which are not illustrated. The plate 10 shown in FIG. 4 will shift to a position over the frame 53 and an introduction plate 54 which is fixed on a shim 55. Two stops 56, only one is shown in FIG. 3, are mounted on a cross-piece 57 and limit the movement of the plate 10 into the pressing station.

Figure 4:
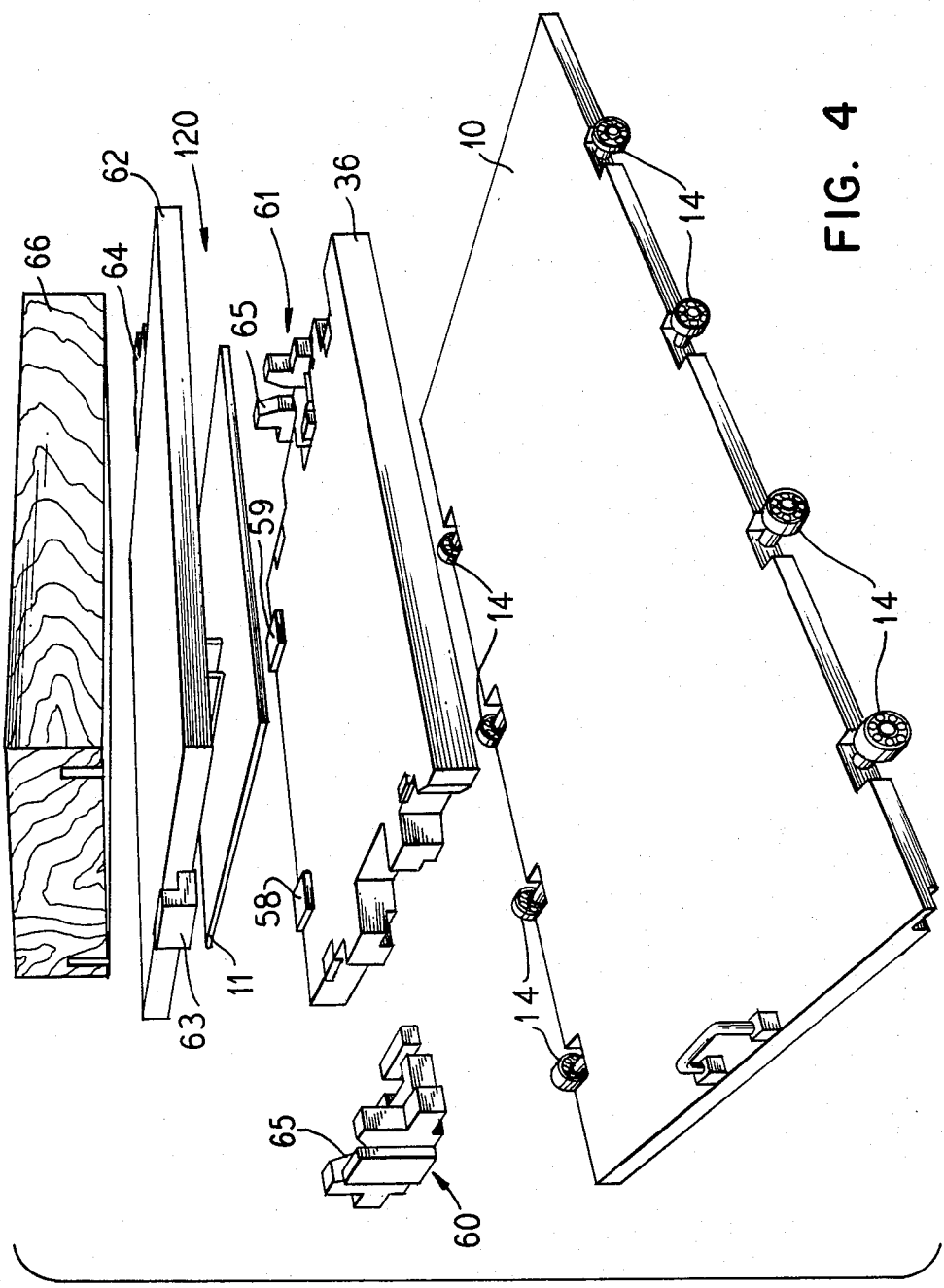
FIG. 4 is an exploded perspective view of the stack containing the members being processed in the device according to FIG. 1.
Figure 5:
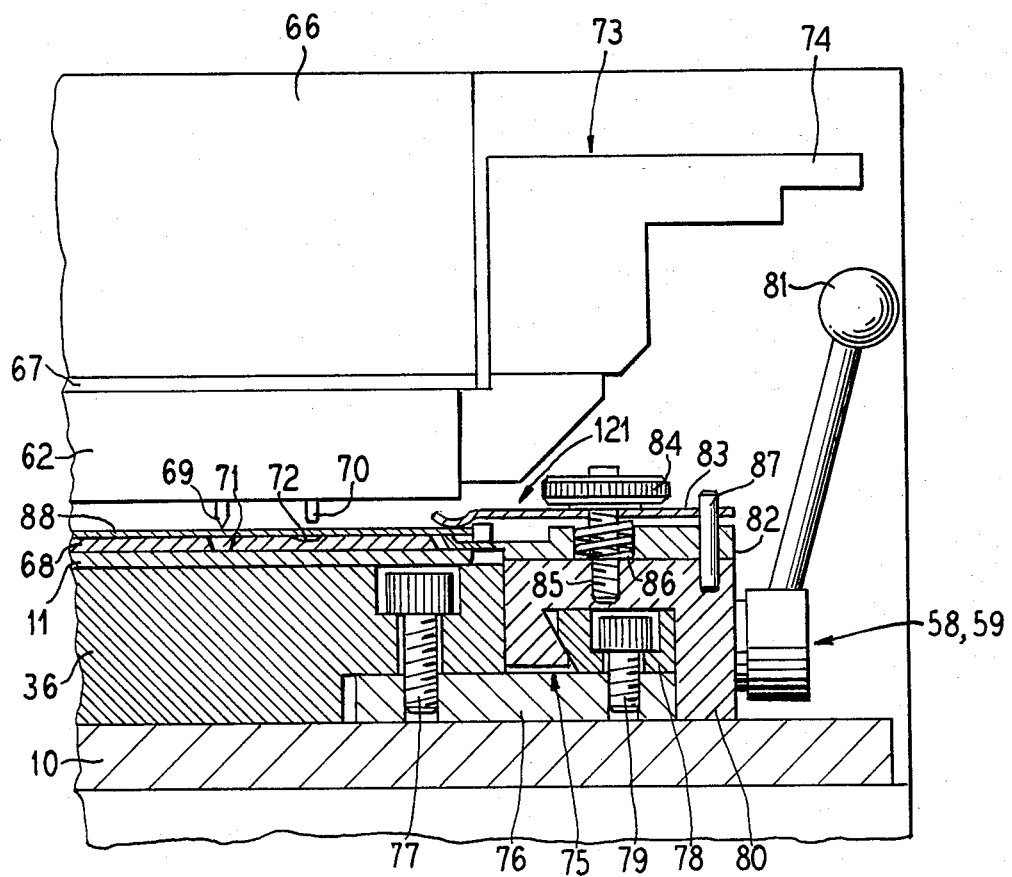
FIG. 5 is a partial cross-sectional view with portions in elevation for purposes of illustration of a stack of members disposed in the device of the present invention.

As best illustrated in FIG. 4, the stack 120 is positioned on the plate 10 to be transported between the loading and the pressing stations. The stack 120 includes a frame 36 on which the die member 11 has been previously positioned. The positioning of the die member 11 on the frame 36 is insured by lateral stops 58 and 59 as well as a frontal stop 60 and a rear or back stop 61. A punch member which is illustrated in FIG. 4 as an upper tool member 62 has two centering members 63 and 64 which are engaged in a fork 65 mounted on the front stop 60 and the rear stop 61. Thus, the registration of the upper tool or punch member 62 with the die 11 is insured. To allow the processing with the upper die 62 having various thicknesses and warranting good contact between the various elements, a thickness block 66, which acts as a support block is provided. As best illustrated in FIGS. 5, 6 and 7, the block 66, which may have variable thicknesses to compensate for changes in the thickness of the punch member 62, lies on a bottom plate 67 of a frame or a support 73 that holds or secures the punch member 62. Thus, the stack is completed and ready for insertion into the loading opening 5 and after this has been accomplished, pressure can be applied.

As best illustrated in FIG. 5, die member 11 is covered with a liner 68 of a relatively hard fiber material. This liner 68 is usually glued onto the surface of the die member 11 by means of the device of the present invention. Once the liner 68 is moved onto the die member 11 the various working areas of the cutting blades 69 and the creasing blades or rules 70 are marked. After marking the positions of the blades 69 and 70, grooves 71 and 72 are machined into the lining 68 over the entire length of the cutting and creasing rules or blades 69 and 70. The grooves 71 follow the processing area of the cutting blade 69 and deeply penetrates through the hole thickness of the liner 68 whereas the grooves 72 correspond to the lines where the creasing rules 70 are and is cut only partially through the thickness of the liner 68 and to the desired width to enable creasing. It is difficult to precisely determine the dimensions of the grooves 72 since they will depend on the thickness of the cardboard as well as on the texture and its resistance, etc. These values are determined approximately by a specialist and from case-to-case applications. Thus, these dimensions have been memorized and they can be called back any time if necessary.

The upper tool or punch member 62 as mentioned hereinbefore is maintained in a support frame 73 which is provided with centering members 74 that will insure its position in the press. The frame 36 will have a sliding member which extends along the lateral length. This sliding member comprises a slide 75 which has a sole or base plate 76 which is fixed on the frame 36 by screw 77. A bar 78 is secured by screws 79 to this sole or base plate 76. Two sliders 80 (only one shown in FIG. 5) engage the sliding member 75. They can be locked along the sliding member 75 with a tightening arrangement or screw 81. The two sliders 80 are slightly thicker than the frame 36 and thus operate as stops for the die member 11. The two sliders 80 are also provided on their upper part with a gripper 121 which has a lower jaw 82 and an upper movable jaw 83 which can be tightened relative to each other as needed by a threaded nut 84 which is received on a threaded rod 85. A spring 86 biases the upper jaw 83 toward an open position as the nut 84 is released. The upper jaw 83 and the lower jaw 82 are positioned one with regard to the other with a centering pin 87. In the illustrated embodiment, a testing sheet 88 can be inserted and maintained in the adequate position between the upper tool or punch member 62 and the die member 11 by its grippers 121 and this sheet enables control of the quality of the die member 11.

In FIG. 6, the stack is positioned over the pressing means and no pressure has been applied or exerted by the pressing means. The piston 52 will rest on the support blades such as 43-46 when no oil under pressure has been placed into the recess such as 42. The vertical stroke of the piston 52 is limited by an adjustable stroke control device 89, which is actuated by a finger 90 which is mounted on a side of the piston 52 and extends through an opening in the upper frame 53. The inner frame 51 is secured to the piston by a screw such as 91.

The centering member 64 of the upper tool or punch member 62 is illustrated as being secured thereto by screws such as 92 and as previously mentioned the member 64 is received in the fork 65 of the rear stop 61. As illustrated in this Figure, "pre-prepared" counterparts such as 93 which can be easily transferred by pressure and self-adhesion onto the die 11 are provided. These parts are illustrated as being mounted on a holding pin such as 96 that are mounted in the punch member 62 with grooves corresponding to the grooves 71 and 72 (FIG. 5) being aligned with the cutting blades 69 and creasing rules 70.

In order to apply oil into the recess 42 of the plate 40 to act on the membrane 41, the plate 40 has a passage 94 that extends to a fitting on its edge that is connected to a tube or a hose 95 that extends to a pump not illustrated. Thus, oil under pressure is applied through the hose 95, the passage 94 into the recess 42 as illustrated in FIG. 7. This causes the membrane 41 to be urged away from the plate 42 to engage the piston 52 and to deflect or bend the blades 43-46 which were held against the membrane by the frame formed by the blade guides 47-50. As mentioned hereinbefore, this arrangement avoids excessive fatigue of the member 41 and allows the operation to be repeated a large number of times.

By the application of pressure in the recess 42 to urge the piston 52 in an upward direction, the die member 11 is pressed against the tool member 62 and the counterparts such as 93 are transferred from the upper tool 62 to the die member 11. It should be noted that after the transfer has been accomplished and the stack has been unloaded, the holding pin such as 96 can be removed from the punch member. It should be noted that the force generated by the piston 52 depends on the pressure developed by the oil supplying pump and can be adequately adjusted. Thus, the device can also be utilized for preparation of embossing or stripping dies as shown in FIGS. 8 and 9.

Figure 8:
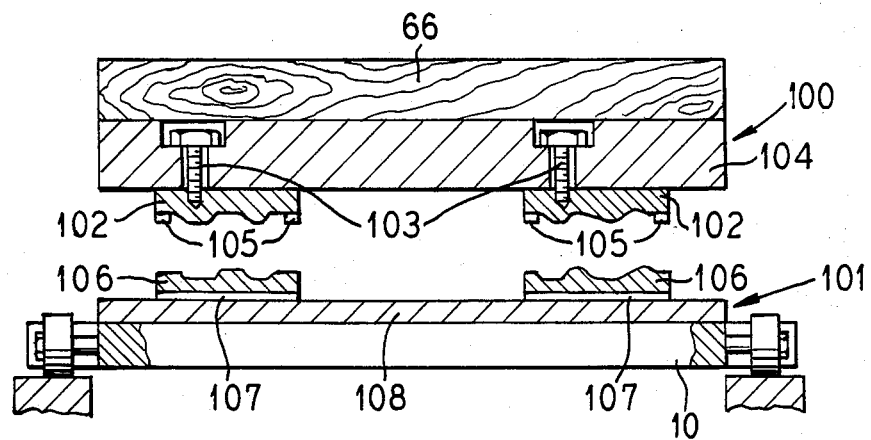
FIG. 8 is a partial cross-sectional view with portions in elevation of embossing tools.
Figure 9:
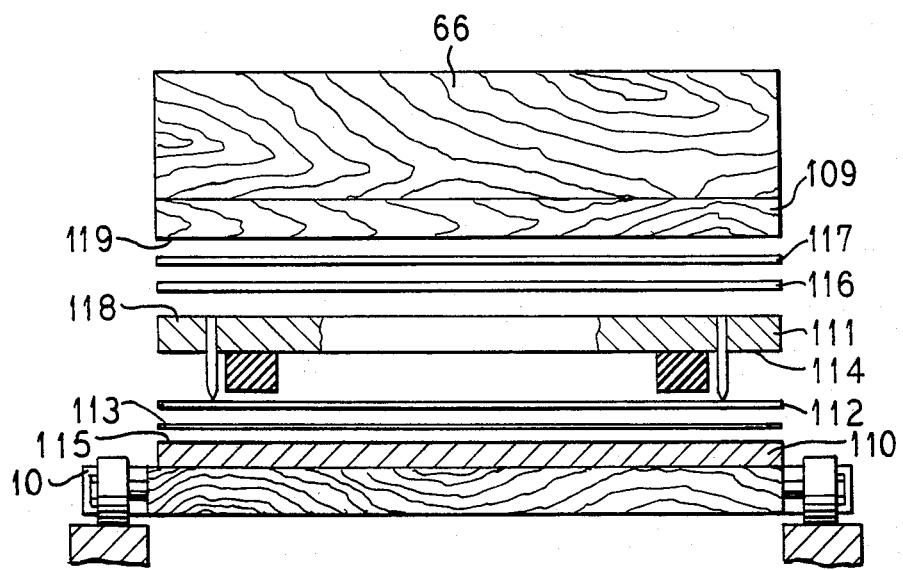
FIG. 9 is a partial cross-sectional view with portions in elevation of a stack of stripping tools.

In FIG. 8, an embossing tool comprising an upper tool or punch member 100 that includes embossing plates 102 that are fastened by bolts 103 onto a support plate 104. Each of the embossing tool or punch plates 102 is provided with a small self-adhesive or pressure-sensitive adhesive strip 105 which holds a counter-member 106 thereto. The counter-member 106 also has a self-adhesive or pressure-sensitive adhesive face 107 which insures that when the device is placed under the pressure, each of the counter-members 106 will adhere to the plate 108 of a die member 101. Thus, the counter-member 106 will be secured to this plate in the desired registry so that the recesses in the counter-member will be in registry with the projections of the punch member 100. As in the previous process, the stack of the members such as 100 and 101 were assembled on the plate 10 of the transport means and provided with the backup or support block 66.

As mentioned hereinbefore, the device can also be used for insuring that the die member of the stripping tool has openings or recesses in registry with the waste portions which are to be removed from the die cut sheet. As illustrated in FIG. 9, the stripping tool having an upper stripping board 109 and a lower stripping board or die member 110 is illustrated. These boards 109 and 110 are cut according to the pattern of the upper tool 111 and the print of a box blank pattern on the boards 109 and 110 is realized by the compression of the assembly comprising the boards 109 and 110 and the upper tool or punch member 111. Before the operation, a sheet 112 of solid paper and a carbon paper sheet 113 are inserted between a face 114 of the punch member 111 and a face 115 of the lower stripping board or die member 110. A sheet of resistant paper 116 and a sheet of carbon paper 117 are also inserted between an upper face 118 of the punch member 111 and a face 119 of the upper stripping board 109. The whole assembly or stack is thus disposed on the plate 10 with the thickness or support block 66. After pressure has been applied, the pattern of the punches or blades of the punch member 111 will be seen on the surfaces 115 and 119 of the boards 110 and 109, respectively. Thus, the necessary recesses for removing the material that is being stripped from the die cut sheets can be cut into the board and the various stripping pins mounted.

It should be noted that the term "die member" should encompass not only the die member for the punch member of the die cutting station of a platen press but also the stripping board for the stripping station and also a member supporting counter-member such as 106 for an embossing tool which has a punch member with embossing tool similar to 102 secured thereon.

The advantage of the present device is that the various die members, that coact with the punch member, whether they are the die members coacting with the die cutting member in the die cutting section, the members used in the stripping station or the embossing station can be prepared outside of the press. Thus, after being prepared, they can be easily inserted with the desired alignment in the platen press with a minimum amount of down time and thus a much less of a negative effect on the output of the platen press.

Although various minor modifications may be suggested by those versed in the art, it should be understood that I wish to embody within the scope of the patent granted hereon, all such modifications as reasonably and properly come within the scope of my contribution to the art.

I claim:

1. A device for preparing a die member of a platen press to have recesses in registry with tools of a punch member, said device having a pressing station with means for receiving a stack of members including at least one backup member, a die member and the punch member, said pressing station having means for applying pressure to the stack to at least transfer an outline of the tools of the punch member to the surface of the die member, a loading station having means for loading and unloading a member of the stack into and out of the loading station, said loading means including means for positioning each of the members in the desired orientation; and transport means for moving the stack between the pressure station and the loading station, said transport means including a plate receiving this stack and being movable between said stations so that after loading the stack on the plate, the transport means transports the stack and plate into the pressing station wherein the means for pressing applies pressure to cause a transfer of the outline of the tools of the punch member onto a surface of the die member.

2. A device according to claim 1, wherein the pressing station includes an upper and lower bolster forming a space for receiving the stack and the pressing means, and wherein the means for loading and unloading includes a column having an arm with a hoist supported on said arm, said column being secured to at least one of the upper and lower bolsters.

3. A device according to claim 1, wherein the means for positioning includes a stirrup having a cross-piece with two downwardly extending arms, gripping means secured on the ends of each of said two arms, each of said gripping means including a grip mounted on an axle, said axle being rotatably mounted in a housing of the gripping means and at least one of said gripping means having means enabling the axle to be moved axially in the bore and means for locking the axle in both the axial and angular positions.

4. A device according to claim 1, wherein the transport means includes a track formed by a pair of parallel extending rails extending from the loading station and into the pressing station, said plate being mounted by rollers to move on said track.

5. A device according to claim 1, wherein the means for pressing include a hydraulic plate having a recess, a membrane covering said recess, a plurality of support blades engaging and holding the edges of the membrane onto the hydraulic plate, blade guides forming an outer frame resting on the support blades, an inner frame received in the outer frame, a guide frame disposed on the outer frame, a piston being guided by the inner frame and the guide frame, and means for applying a fluid under pressure in said recess to shift the piston.

6. A device according to claim 5, wherein the pressing station comprises an upper and a lower bolster spaced apart, said pressing means being disposed on said lower bolster and the membrane acting directly against a lower face of the piston.

* * * * *